US011283361B2

(12) United States Patent
El Markhi et al.

(10) Patent No.: US 11,283,361 B2
(45) Date of Patent: Mar. 22, 2022

(54) RESONANT RECTIFIER CIRCUIT WITH CAPACITOR SENSING

(71) Applicant: Texas Instruments Incorporated, Dallas, TX (US)

(72) Inventors: Mustapha El Markhi, Richardson, TX (US); Erhan Ozalevli, Richardson, TX (US); Tuli Dake, McKinney, TX (US); Dingkun Du, Sunnyvale, CA (US); Gianpaolo Lisi, Los Gate, CA (US); Jingwei Xu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/554,095

(22) Filed: Aug. 28, 2019

(65) Prior Publication Data
US 2019/0386575 A1 Dec. 19, 2019

Related U.S. Application Data

(63) Continuation of application No. 15/279,094, filed on Sep. 28, 2016, now Pat. No. 10,439,502.

(51) Int. Cl.
*H02M 3/335* (2006.01)
*H02J 50/12* (2016.01)
*H02M 1/08* (2006.01)

(52) U.S. Cl.
CPC ......... *H02M 3/33592* (2013.01); *H02J 50/12* (2016.02); *H02M 1/081* (2013.01); *H02M 1/083* (2013.01); *Y02B 70/10* (2013.01)

(58) Field of Classification Search
None
See application file for complete search history.

(56) References Cited

U.S. PATENT DOCUMENTS

| | | | | |
|---|---|---|---|---|
| 6,301,128 | B1* | 10/2001 | Jang | B60L 53/122 363/17 |
| 2007/0097717 | A1* | 5/2007 | Hsu | H02M 3/33592 363/53 |
| 2014/0035525 | A1 | 2/2014 | Vossberg | |
| 2014/0191818 | A1* | 7/2014 | Waffenschmidt | H01F 38/14 333/17.1 |
| 2014/0354303 | A1 | 12/2014 | Harrison | |

(Continued)

OTHER PUBLICATIONS

Search Report for PCT Application No. PCT/US17/54095, dated Dec. 28, 2017, 1 page.

(Continued)

*Primary Examiner* — Rexford N Barnie
*Assistant Examiner* — Terrence R Willoughby
(74) *Attorney, Agent, or Firm* — Mark Allen Valetti; Charles A. Brill; Frank D. Cimino

(57) ABSTRACT

A wireless power transfer system using a resonant rectifier circuit with capacitor sensing. A wireless power transfer system includes a power receiver resonant circuit and a synchronous rectifier. The power receiver resonant circuit includes an inductor and a capacitor connected in series with the inductor. The synchronous rectifier is configured to identify zero crossings of alternating current flowing through the inductor based on voltage across the capacitor, and control synchronous rectification of the alternating current based on timing of the zero crossings.

25 Claims, 3 Drawing Sheets

(56) References Cited

U.S. PATENT DOCUMENTS

| | | | |
|---|---|---|---|
| 2015/0244176 A1 | 8/2015 | Van Den Brink et al. | |
| 2015/0295418 A1 | 10/2015 | Ren et al. | |
| 2016/0105035 A1 | 4/2016 | Venderbosch et al. | |
| 2017/0117751 A1* | 4/2017 | Karnstedt | H02J 7/025 |
| 2017/0338695 A1* | 11/2017 | Port | H02J 50/12 |

OTHER PUBLICATIONS

Supplementary Search Report for European Application No. 17857445.5, dated Sep. 18, 2019, 2 pages.

* cited by examiner

RESONANT RECTIFIER CIRCUIT WITH CAPACITOR SENSING

CROSS-REFERENCE TO RELATED APPLICATIONS

Under 35 U.S.C. § 120, this continuation application claims benefits of and priority to U.S. patent application Ser. No. 15/279,094 (TI-76876), filed on Sep. 28, 2016, the entirety of which are hereby incorporated herein by reference.

BACKGROUND

The popularity of wireless power transfer for charging energy storage devices and/or powering electronic devices is growing rapidly. For example, mobile electronic devices are now widely used, and are likely to see increased use in the future. Mobile devices are generally powered by batteries or other energy storage devices that must be recharged at regular intervals. Recharging may be accomplished via a wired or wireless connection to a power source. Wired charging requires that the device being charged be connected to a power source via a charging cable, Which can sometimes be inconvenient. In contrast, wireless recharging systems transfer power without connective cabling and consequently can provide a much more convenient charging experience than wired chargers.

Wireless power transfer is also advantageous for reasons other than convenience. For example, wireless power transfer is well-suited for use in industrial environments, where sparks from a wired charger could ignite explosive gases, and for use with biomedical devices that require sterile, hermetically sealed cases.

To facilitate power transfer over longer distances and to allow for reduction in size of system passive components (e.g., inductors), the frequency of operation of wireless charging systems is increasing.

SUMMARY

A wireless power transfer system using a resonant rectifier circuit with capacitor sensing is disclosed herein. In one embodiment, a wireless power transfer system includes a power receiver resonant circuit and a synchronous rectifier. The power receiver resonant circuit includes an inductor and a capacitor connected in series with the inductor. The synchronous rectifier is configured to identify zero crossings of alternating current flowing through the inductor based on voltage across the capacitor, and control synchronous rectification of the alternating current based on timing of the zero crossings.

In another embodiment, a synchronous rectifier includes a comparator, a phase shifter, and a bridge. The comparator is configured to identify zero crossings in voltage across a capacitor of a series resonant circuit connected across the bridge. The phase shifter is coupled to an output of the comparator, and is configured to generate, based on the zero crossings identified by the comparator, a signal having zero crossings corresponding in time to zero crossings of alternating current flowing in the resonant circuit.

In a further embodiment, a method for wireless power transfer includes inducing current flow in an inductor and a capacitor of a resonant circuit. Voltage across the capacitor is detected. The voltage is associated with the current flow. Transistors of a synchronous rectifier are driven based on timing of the voltage detected across the capacitor.

BRIEF DESCRIPTION OF THE DRAWINGS

For a detailed description of various examples, reference will now be made to the accompanying drawings in which.

DETAILED DESCRIPTION

Figure 1:
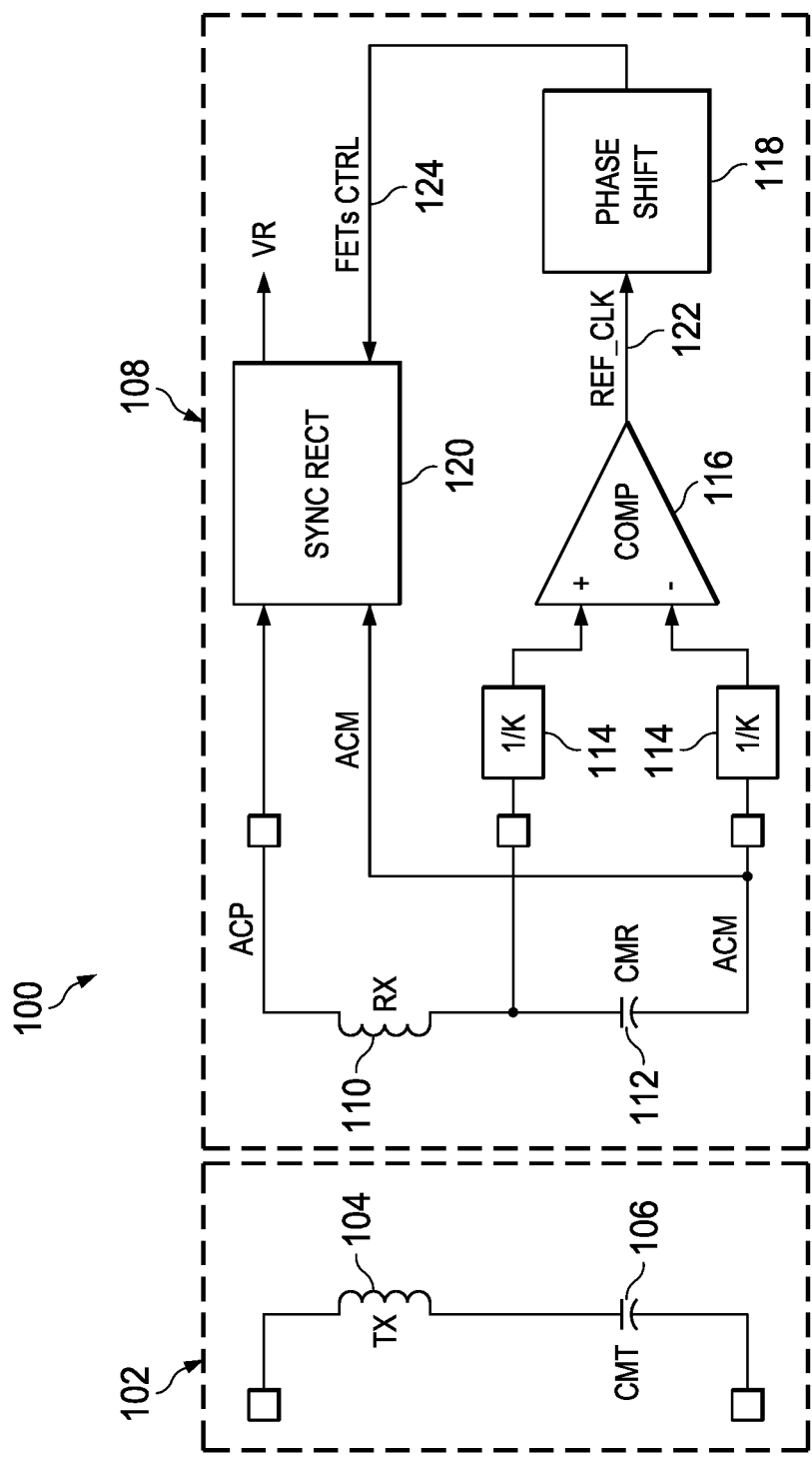
FIG. 1 shows a high level diagram for a wireless power transfer system that includes a resonant rectifier with capacitor sensing in accordance with various embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

In the drawings and description that follow, certain features of the invention may be shown exaggerated in scale or in somewhat schematic form, and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings and components of the embodiments discussed below may be employed separately or in any suitable combination to produce desired results.

In resonant wireless power transfer systems, the timing of bridge circuit field effect transistor (FET) activation must be carefully controlled to optimize efficiency. Resonant rectifiers include a feedback loop that controls bridge FET activation timing. In conventional resonant rectifiers, the feedback loop includes a sense FET, in parallel with a bridge high-side power FET, to produce a sense current. The sense current flows through a sense resistor to allow detection of zero crossings of the current flowing in a receiver coil. Unfortunately, all of the bridge FETs are off at the time that the current in the receiver coil crosses zero which tends to introduce glitches into, and thereby corrupt, the high-side bridge FET currents. The glitches can cause loop control circuitry to produce multiple pulses within a cycle of the resonant frequency, and to eventually lose control of the feedback loop, resulting is sever degradation of power efficiency and output regulation. Furthermore, current sensing inaccuracies in such a conventional system can induce delay and jitter, which in turn lead to improper zero current detection.

Embodiments of the present disclosure overcome the zero crossing detection issues suffered by conventional systems by monitoring the voltage across the capacitor of the series resonant circuit rather than the current through the inductor of the series resonant circuit. Because the voltage across the capacitor is not affected by switching of the bridge FETs, the sense waveform applied in the embodiments disclosed herein is free of the defects found in conventional resonant rectifiers. The voltage across the capacitor is shifted in phase by 90° relative to the current in the inductor, and embodiments shift the voltage signal detected across the capacitor by 90° to produce signal transitions that correspond in time to the zero crossings of the current in the inductor of the resonant circuit. Embodiments apply the phase shifted signal to control the bridge FETs. By controlling bridge FET timing based on resonant capacitor voltage, embodiments of the present disclosure provide a much more robust synchronous rectifier than is provided in conventional wireless power transfer systems.

FIG. 1 shows a high level diagram for a wireless power transfer system 100 that includes a resonant rectifier with capacitor sensing in accordance with various embodiments. The system 100 includes a power transmitter 102 and a power receiver 108. The power transmitter 102 includes a resonant circuit formed by an inductor 104 and a capacitor 106. The power transmitter 102 may include any number of the additional components that have been omitted for the sake of clarity. For example, the power transmitter 102 may include a power supply, timing circuits, and drive circuits to generate a drive signal that is applied to the inductor 104 and the capacitor 106. The power transmitter 102 drives the inductor 104 and the capacitor 106 at the resonant frequency of the inductor 104 and the capacitor 106 to produce an oscillating magnetic field at the resonant frequency. In some embodiments, the frequency of the oscillating magnetic field generated by the power transmitter 102 may be relatively high (e.g., 6.78 mega-hertz or higher).

The power receiver 108 includes a resonant circuit formed by an inductor 110 in series with a capacitor 112. The resonant frequency of the inductor 110 and the capacitor 112 may be approximately the same as the frequency of the oscillating magnetic field generated by the power transmitter 102. The magnetic field generated by the power transmitter 102 induces a current in the inductor 110 and the capacitor 112 at the frequency of magnetic field oscillation.

The power receiver 108 also includes a synchronous rectifier 120, a comparator 116, clamping/scaling circuitry 114, and phase shift circuitry 118. The comparator 116 is connected across the capacitor 112 via the clamping/scaling circuitry 114. More specifically, one input terminal of the comparator 116 is connected to each terminal of the capacitor 112 via the clamping/scaling circuitry 114. The clamping/scaling circuitry 114 may include resistor networks to adjust the amplitude of the voltage signal received by the comparator 116 and/or diodes or other circuitry to limit the voltage signal received by the comparator 116 to no more than a predetermined amplitude (e.g., the voltage of the power supply powering the comparator 116).

The comparator 116 generates a square wave with zero crossings corresponding in time to the zero crossings of the sinusoidal voltage across the capacitor 112. The power receiver 108 uses the voltage across the capacitor 112 for sensing zero crossings because the voltage across the capacitor 112 is shifted in phase by 90° relative to the current flowing in the inductor 110, and consequently, the zero crossing timing of the voltage is immune to the distortions found in current sensing. The 90° phase shift between inductor current and capacitor voltage can be verified based on the current flowing in the inductor 110 and the capacitor 112 being the same (i.e., the inductor 110 and the capacitor 112 are connected in series so the current must be the same). The current through the capacitor 112 can expressed as:

$$i_C = C \frac{dv_C}{dt} \quad (1)$$

where $i_C$ is the current flowing in the capacitor 112 and $v_C$ is the voltage across the capacitor 112. At resonant frequency, the voltage across the capacitor 112 is sinusoidal. Therefore, voltage across the capacitor 112 and the current in the capacitor 112 can be expressed as:

$$v_C = A \sin(\omega t) + \phi_0, \text{ and} \quad (2)$$

$$i_C = A\omega \cos(\omega t) \quad (3)$$

Because the sine and cosine terms in equations (2) and (3) make voltage across and current in the capacitor 112 90° out of phase, current in the inductor 110 and voltage across the capacitor 112 are also 90° out of phase. Use of the 90° phase shifted sense signal produced by the comparator 116 allows the power receiver 108 to avoid the switching noise and glitches found at the zero crossings of the current in the inductor 110.

Figure 2:
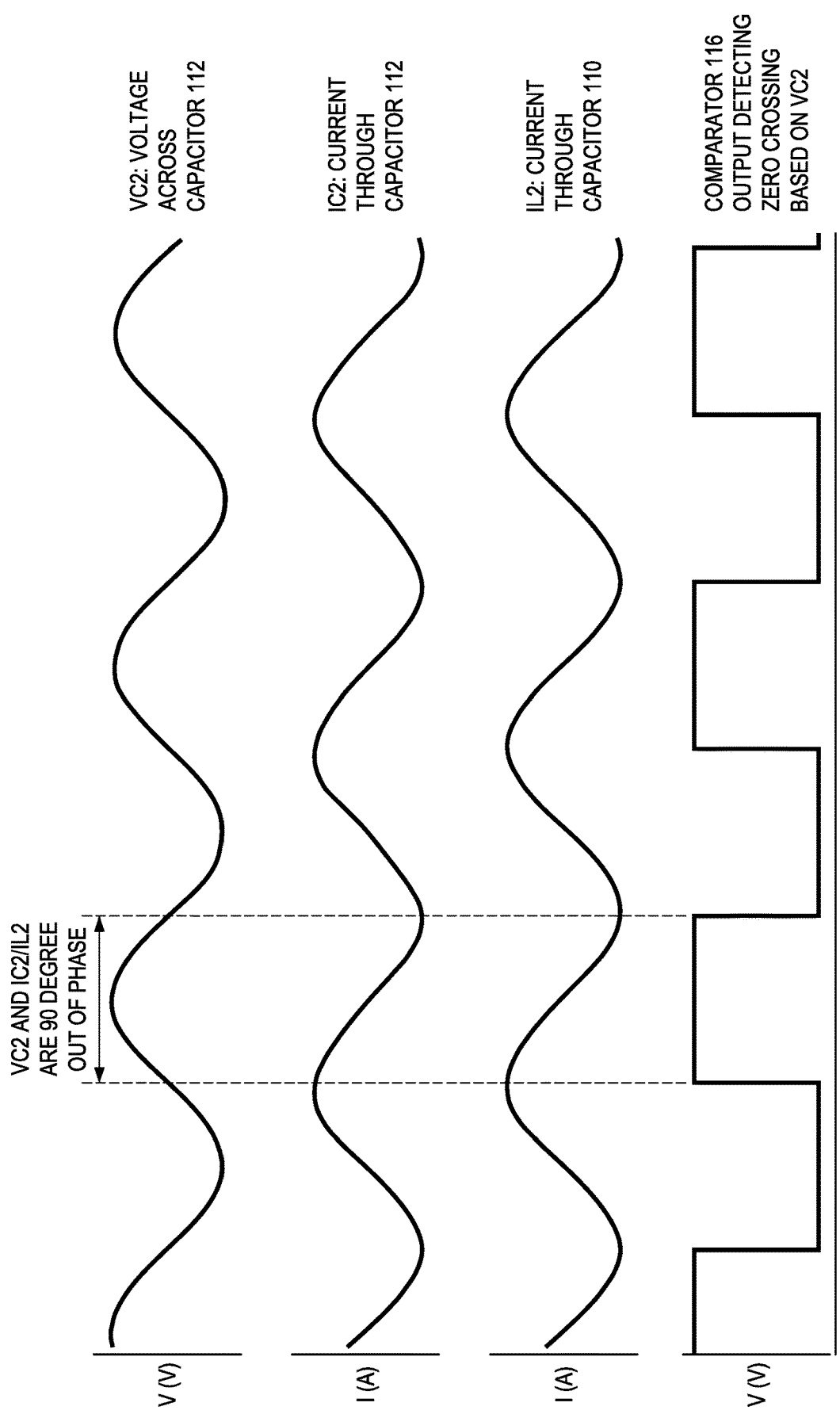
FIG. 2 shows current and voltage signals in a resonant rectifier circuit that includes capacitor sensing in accordance with various embodiments.

FIG. 2 shows representative voltage and current signals in the system 100. In FIG. 2, the signal VC2 represents the voltage across the capacitor 112, the signal IC2 represents the current flowing in the capacitor 112, and the signal IL2 represents the current flowing in the inductor 110. As shown in FIG. 2, the voltage across the capacitor 112 is shifted in phase by 90° relative to the current flowing in the capacitor 112 and the inductor 110. The zero crossings in comparator output signal 122 correspond in time to the zero crossings in voltage across the capacitor 112.

Returning now to FIG. 1, the comparator 116 is coupled to the phase shift circuitry 118, and the comparator output signal 122 is provided to the phase shift circuitry 118. The phase shift circuitry 118 shifts the comparator output signal 122 by 90°. The phase shift circuitry 118 may include a phase-locked loop (PLL), a delay-locked loop (DLL) or other phase shifting circuitry capable of producing a signal corresponding to the comparator output signal 122 shifted in phase by 90°. By shifting the comparator output signal 122 by 90°, the phase shift circuitry 118 produces a signal having zero crossings that correspond to and align with the zero crossing of the current flowing in the inductor 110.

The phase shift circuitry 118 may also include circuitry to generate control signals for driving the synchronous rectifier 120. The timing of the control signals may be based on the timing (e.g., the zero crossing timing) of the comparator output signal 122 shifted in phase by 90°. The synchronous rectifier 120 includes power FETs arranged as an H-bridge. The control signals generated by the phase shift circuitry 118 drive the power FETs with timing that prevents cross conduction. That is, control signals may drive the power FETs with timing that prevents the connected high-side power FETs and low-side power FETs from turning on at the same time. This creates a "dead time" during which all the power FETs are turned off. The dead time coincides with the zero crossings in the current flowing in the inductor 110 as derived from the zero crossings of the voltage across the capacitor 112.

The synchronous rectifier 120 produces a DC output (VR) that may be regulated, filtered, converted to a higher or lower DC voltage, etc. and used to charge batteries of the system 100 and/or power circuitry of the system 100.

Figure 3:
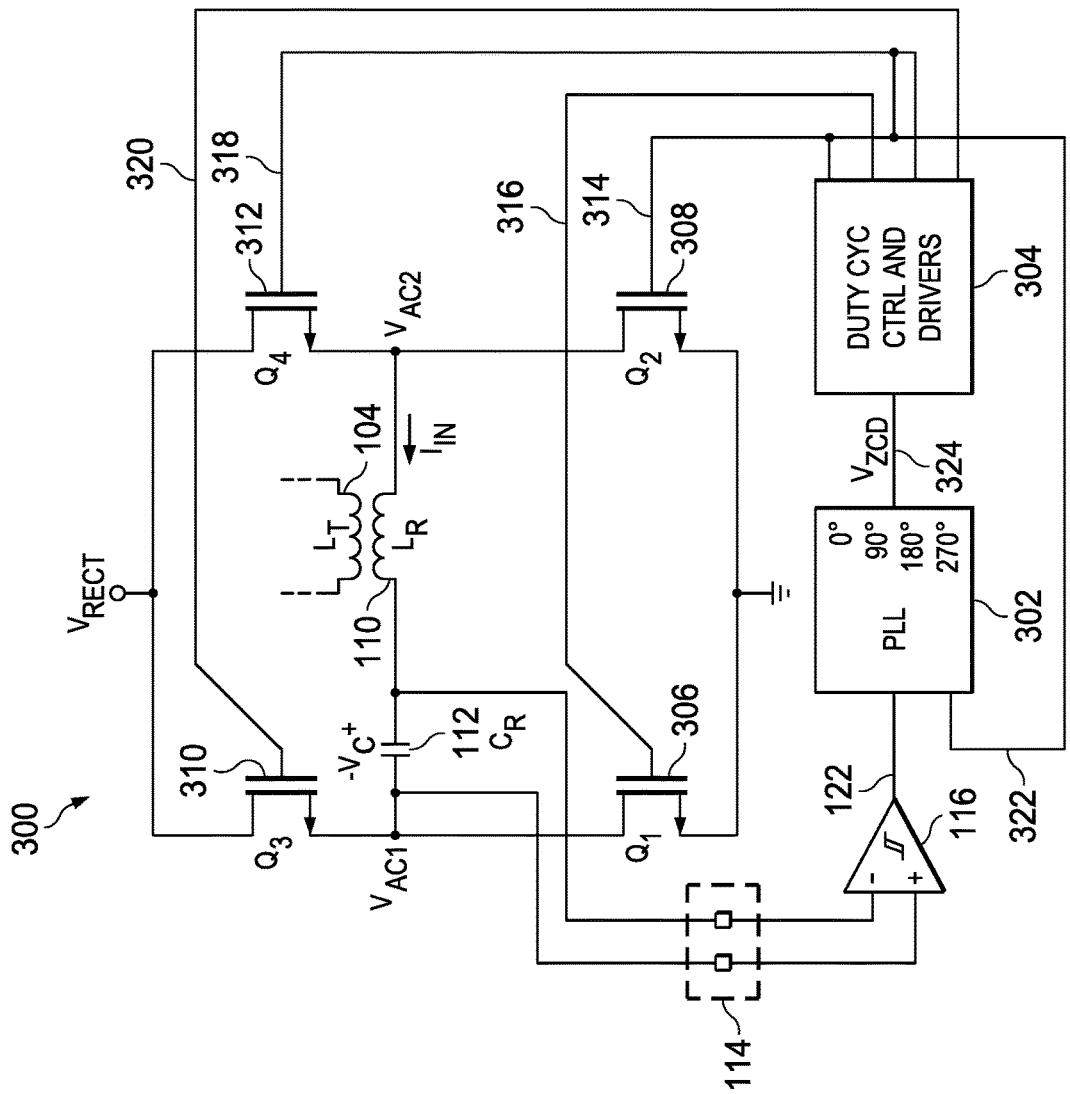
FIG. 3 shows a schematic diagram for a wireless power receiver that includes a resonant rectifier circuit with capacitor sensing in accordance with various embodiments.

FIG. 3 shows a schematic diagram for a wireless power receiver 300 that includes a resonant rectifier circuit with capacitor sensing in accordance with various embodiments. The wireless power receiver 300 may be an embodiment of the wireless power receiver 108. In FIG. 3, the inductor 104 of the power transmitter is not part of the receiver 300, but is shown for reference. The wireless power receiver 300 includes the inductor 110, capacitor 112, comparator 116, a PLL 302, duty cycle control and driver circuitry 304, and power FETs 306, 308, 310, and 312. The wireless power receiver 300 may also include the clamping/scaling circuitry 114. In some embodiments of the wireless power receiver 300, the PLL 302 may be replaced by a DLL or other phase shifting circuitry.

The power FETs 306, 308, 310, and 312 are connected to form an H-bridge. The resonant circuit formed by the inductor 100 and the capacitor 112 is connected across the H-bridge. The oscillating magnetic field generated by the inductor 104 of the power transmitter induces current flow in the inductor 110 and the capacitor 112. The comparator 116, PLL 302, and duty cycle control and driver circuitry 304 are connected to the H-bridge and the resonant circuit to form a feedback loop that controls the power FETs 306, 308, 310, and 312 and synchronizes rectification with the current waveform induced in the inductor 110.

The input terminals of the comparator 116 are connected across the capacitor 112 as described herein with respect to the power receiver 108. The comparator 116 generates an output signal 122 (e.g., a square wave) corresponding in frequency and phase to the sinusoidal voltage across the capacitor 112. The output signal 122 of the comparator 116 serves as a reference clock for the PLL 302.

The PLL 302 may include a voltage controlled oscillator, a phase comparator, a charge pump, a low pass filter, frequency dividers, and other components that allow the PLL to generate various frequencies that are phase locked to the output signal 122 of the comparator 116. The PLL 302 may include delay elements (e.g., formed by sequential logic) that produce output signals that are shifted in phase by 90°, 180°, 270° and/or 360° relative to the output signal 122 of the comparator 116. For example, the PLL 302 may generate a clock four times the frequency of, and phase locked to, the output signal 122 of the comparator 116, and apply the clock to generate the 90°, 180°, 270° and 360° phase shifted versions of the signal 122. In some embodiments, one or more of the 90°, 180°, 270° and 360° phase shifted version of the signal 122 may be generated at twice the frequency of the signal 122 and divided by two to ensure 50% duty cycle.

The duty cycle control and driver circuitry 304 generates the gate control signals 314, 316, 318, and 320 to control the power FETs 308, 306, 312, and 310 respectively. The duty cycle control and driver circuitry 304 receives the 90° phase shifted version of the signal 112 produced by the PLL 302 and generates the gate control signals 314, 316, 318, and 320 with timing based on zero crossing of the current in the inductor 100, as provided by the PLL output signal 324. As explained above, the duty cycle control and driver circuitry 304 generates the gate control signals 314, 316, 318, and 320 to provide dead time around the zero crossings in the current in the inductor 110. The duty cycle control and driver circuitry 304 may include sequential and/or combinatorial logic to generate the timing of the gate control signals 314, 316, 318, and 320. Because the high-side FETs 310 and 312 may be N-channel FETs, the duty cycle control and driver circuitry 304 may include level shifters to drive the gate control signals 318 and 320.

One of the gate control signals 314, 316, 318, and 320 may be connected to the feedback input 322 of the PLL 302. In some embodiments, the one of the control signals 318 and 320 may be connected to the feedback input 322 of the PLL 302 to compensate for delay in the level shifters that drive the high-side power FETs 310 and 312.

Figure 4:
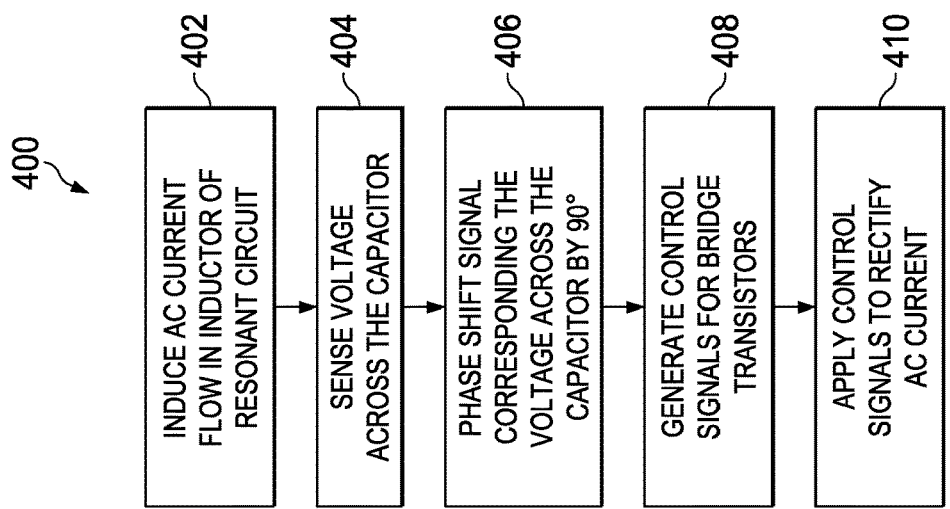
FIG. 4 shows a flow diagram for a method for resonant rectification using capacitor sensing in accordance with various embodiments.

FIG. 4 shows a flow diagram for a method 400 for resonant rectification using capacitive sensing in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be implemented by components of the power receiver circuits 108 or 300.

In block 402, current flow is induced in the resonant circuit formed by the inductor 110 and the capacitor 112 of the wireless power receiver 108. In some embodiments, the wireless receiver 108 may be positioned within an oscillating magnetic field generated by the wireless power transmitter 102 to initiate the flow of AC current in the inductor 110 and the capacitor 112.

In block 404, the comparator 116 senses the voltage across the capacitor 112. The voltage across the capacitor 112 is sinusoidal. The comparator 116 produces a square wave with edges corresponding in time to the zero crossings of the sinusoidal voltage across the capacitor 112.

In block 406, the output 122 of the comparator 116 is shifted in phase by 90°, by phase shifter 118, which may be a PLL, a DLL, or other phase shifting device. The transitions in the 90° phase shifted version of the output 122 of the comparator 116 occur at a time corresponding to zero crossings in the AC current flowing in the resonant circuit.

In block 408, bridge transistor control circuitry (e.g., the duty cycle control and driver circuitry 304) generates timing signals to control bridge transistors. The timing of the signals is based on the output 122 of the comparator 116 phase shifted by 90°. For example, a first high-side power transistor and a first low-side power transistor may be enabled by the timing signals during a positive half-cycle of the AC current, and a second high-side power transistor and a second low-side power transistor may be enabled by the timing signals during a negative half-cycle of the AC current. The timing signals may disable all of the transistors for a time period about the transitions in the output 122 of the comparator 116 phase shifted by 90° (i.e., about the zero crossings in the AC current to be rectified).

In block 410, the timing signals drive the transistors of the bridge circuit to control rectification of the AC current flowing in bridge. The output of the bridge may be filtered and/or regulated to power other circuitry.

The above discussion is meant to be illustrative of the principles and various embodiments of the present invention. Numerous variations and modifications will become apparent to those skilled in the art once the above disclosure is fully appreciated. For example, while the rectifier bridge of the wireless power receivers 100, 300 have been described as including FETs, in some embodiments, the bridge may include bipolar transistors. It is intended that the following claims be interpreted to embrace all such variations and modifications.

What is claimed is:

1. A device comprising:
   a synchronous rectifier having first and second inputs adapted to be coupled across a resonant circuit including an inductor and a capacitor coupled in series with the inductor;
   circuitry having third and fourth inputs adapted to be coupled across the capacitor, and a control output coupled to a control input of the synchronous rectifier, the circuitry configured to:
      identify a zero crossing of a current conducting by the inductor based on a voltage across the capacitor; and
      control synchronous rectification of the synchronous rectifier based on the identified zero crossing; and
   wherein the circuitry includes:
      a comparator having a non-inverting input and an inverting input configured to receive the voltage across the capacitor, and a comparator output configured to deliver a reference clock signal indicative of the identified zero crossing.

2. The device of claim 1, wherein the circuitry includes:
   a phase shifter having an input configured to receive a reference clock signal indicative of the identified zero crossing, the phase shifter is configured to generate a control signal for controlling the synchronous rectification, the control signal shifted in phase from the reference clock signal.

3. The device of claim 2, wherein the phase shifter includes a phase-locked loop configured to generate the control signal.

4. The device of claim 2, wherein the phase shifter includes a delay-locked loop configured to generate the control signal.

5. The device of claim 2, wherein the control signal is phased-shifted by 90 degrees from the reference clock signal.

6. The device of claim 2, wherein the control signal is phased-shifted by 180 degrees from the reference clock signal.

7. The device of claim 2, wherein the control signal is phased-shifted by 270 degrees from the reference clock signal.

8. The device of claim 2, wherein the control signal is phased-shifted by 360 degrees from the reference clock signal.

9. The device of claim 1, wherein the synchronous rectifier includes:
   an output terminal for delivering a rectified voltage;
   a first transistor configured to regulate a first conductive path between the output terminal and the first input based on a control signal received from the circuitry;
   a second transistor configured to regulate a second conductive path between the first input and a ground terminal based on the control signal;
   a third transistor configured to regulate a third conductive path between the output terminal and the second input based on the control signal; and
   a fourth transistor configured to regulate a fourth conductive path between the second input and the ground terminal based on the control signal.

10. A wireless power receiver comprising:
    a synchronous rectifier configured to generate a rectified voltage based on an input voltage received from a resonant circuit including an inductor and a capacitor coupled in series with the inductor;
    a comparator configured to generate a reference clock signal based on a voltage across the capacitor; and
    a phase shifter configured to generate a control signal phase-shifted from the reference clock signal, the control signal configured to control the synchronous rectifier based on a zero crossing of a current conducted by the inductor.

11. The wireless power receiver of claim 10, wherein the control signal is phased-shifted by 90 degrees from the reference clock signal.

12. The wireless power receiver of claim 10, wherein the control signal is phased-shifted by 180 degrees from the reference clock signal.

13. The wireless power receiver of claim 10, wherein the control signal is phased-shifted by 270 degrees from the reference clock signal.

14. The wireless power receiver of claim 10, wherein the control signal is phased-shifted by 360 degrees from the reference clock signal.

15. The wireless power receiver of claim 10, wherein the reference clock signal is indicative of the zero crossing of the current conducted by the inductor.

16. The wireless power receiver of claim 10, wherein the phase shifter includes a phase-locked loop configured to generate the control signal.

17. The wireless power receiver of claim 10, wherein the phase shifter includes a delay-locked loop configured to generate the control signal.

18. The wireless power receiver of claim 10, wherein the synchronous rectifier includes:
    a first input and a second input coupled across the resonant circuit;
    an output terminal for delivering a rectified voltage;
    a first transistor configured to regulate a first conductive path between the output terminal and the first input based on the control signal;
    a second transistor configured to regulate a second conductive path between the first input and a ground terminal based on the control signal;
    a third transistor configured to regulate a third conductive path between the output terminal and the second input based on the control signal; and
    a fourth transistor configured to regulate a fourth conductive path between the second input and the ground terminal based on the control signal.

19. The wireless power receiver of claim 10, further comprising the inductor and the capacitor.

20. A method of receiving power wirelessly, the method comprising:
    receiving a first voltage across a resonant circuit having an inductor and a capacitor coupled in series with the inductor;
    detecting a second voltage across the capacitor;
    identifying a zero-crossing of a current conducted by the inductor based on the second voltage;
    controlling a synchronous rectifier based on a timing of the zero-crossing; and
    wherein the controlling the synchronous rectifier includes generating a control signal, for controlling the synchronous rectifier, at a frequency of the second voltage and phase-shifted from the second voltage.

21. The method of claim 20, wherein the identifying the zero-crossing of the current includes identifying a zero-crossing of the second voltage.

22. The method of claim 20, wherein the controlling the synchronous rectifier includes generating a control signal, for controlling the synchronous rectifier, at a frequency of the second voltage and phase-shifted by 90 degrees from the second voltage.

23. The method of claim 20, wherein the controlling the synchronous rectifier includes generating a control signal, for controlling the synchronous rectifier, at a frequency of the second voltage and phase-shifted by 180 degrees from the second voltage.

24. The method of claim 20, wherein the controlling the synchronous rectifier includes generating a control signal, for controlling the synchronous rectifier, at a frequency of the second voltage and phase-shifted by 270 degrees from the second voltage.

25. The method of claim 20, wherein the controlling the synchronous rectifier includes generating a control signal, for controlling the synchronous rectifier, at a frequency of the second voltage and phase-shifted by 360 degrees from the second voltage.

* * * * *